United States Patent [19]

Slack et al.

[11] Patent Number: 5,219,973

[45] Date of Patent: Jun. 15, 1993

[54] POLYUREA RIM SYSTEMS

[75] Inventors: William E. Slack, Moundsville, W. Va.; Mark R. Kratz, Hannibal, Ohio

[73] Assignee: Miles Inc., Pittsburgh, Pa.

[21] Appl. No.: 623,469

[22] Filed: Dec. 7, 1990

[51] Int. Cl.$^5$ .......................................... C08G 18/00
[52] U.S. Cl. ........................................ 528/44; 128/61; 128/68; 128/76; 591/51; 591/163; 591/159; 560/50
[58] Field of Search ................. 528/68, 61, 76; 521/163, 51, 159; 560/50

[56] References Cited

U.S. PATENT DOCUMENTS

| | | | |
|---|---|---|---|
| 3,808,250 | 4/1974 | Blahak et al. | 528/68 |
| 3,817,940 | 6/1974 | Blahak et al. | 528/68 |
| 3,929,863 | 12/1975 | Blahak et al. | 528/68 |
| 3,975,428 | 8/1976 | Blahak et al. | 528/68 |
| 4,016,143 | 4/1977 | Blahak et al. | 528/61 |
| 4,136,091 | 1/1979 | Mazanek et al. | 560/50 |
| 4,169,206 | 9/1979 | Mazanek et al. | 560/50 |
| 4,186,257 | 1/1980 | Blahak et al. | 521/159 |
| 4,218,543 | 8/1980 | Weber et al. | 521/51 |
| 4,228,249 | 10/1980 | Blahak et al. | 521/159 |
| 4,260,557 | 4/1981 | Mazanek et al. | 560/50 |
| 4,328,322 | 5/1982 | Baron | 521/163 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,504,648 | 3/1985 | Otani et al. | 528/76 |
| 4,515,981 | 5/1985 | Otani et al. | 560/50 |
| 4,530,941 | 7/1985 | Turner et al. | 521/176 |
| 4,631,298 | 12/1986 | Presswood | 521/163 |
| 4,732,959 | 3/1988 | Otani et al. | 528/68 |
| 4,774,263 | 9/1988 | Weber et al. | 521/51 |
| 4,774,264 | 9/1988 | Weber et al. | 521/51 |
| 4,847,416 | 7/1989 | Durvasula et al. | 564/443 |

Primary Examiner—John Kight, III
Assistant Examiner—Duc Truong
Attorney, Agent, or Firm—Joseph C. Gil; N. Denise Brown

[57] ABSTRACT

The present invention is directed to a RIM process and an isocyanate reactive composition for use therein. The isocyanate composition includes an amine terminated chain extender and an aromatic amine terminated polyether of the formula:

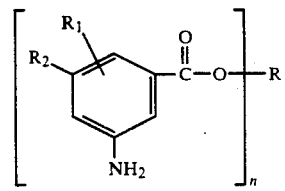

wherein

R is an n-valent group obtained by the removal of hydroxyl groups from an n-hydroxy group containing polyhydroxyl compound having a molecular weight of from about 300 to about 12,000, $R_1$ represents hydrogen or an inert substituent, $R_2$ represents hydrogen, an amine group, or an inert substituent, and n represents an integer from 2 to 4.

14 Claims, No Drawings

POLYUREA RIM SYSTEMS

BACKGROUND OF THE INVENTION

Reaction injection molded (RIM) polyurethanes are well known in the art and have met with substantial commercial success. U.S. Pat. No. 4,218,543 describes the use of relatively high molecular weight hydroxyl group containing materials, aromatic diamines as chain extenders, and isocyanates for the production of RIM parts.

More recently, the activity in the art has been towards the production of polyurea RIM parts. Typically, these parts are made from relatively high molecular weight polyethers which contain amine groups, diamine chain extenders, and isocyanates. Typical of the materials used and the technologies known in the art are those described in U.S. Pat. Nos. 4,396,729, 4,433,067, 4,444,910, 4,530,941, 4,774,263 and 4,774,264. As is known in the art, RIM parts are generally produced from two separate streams. One stream generally contains the isocyanate component, while the other stream contains the amine-containing polyether and the amine chain extender. Amine-containing polyethers where the amine groups are attached to aromatic groups are generally too viscous for use in conventional RIM machinery, while amine-containing polyethers where the amine groups are attached to aliphatic moieties are too reactive to be used alone with conventional aromatic isocyanates. One object of the present invention was to provide a mixture of amine-containing reactant and amine chain extender having a substantially reduced viscosity and thus improved flow characteristics. Additionally, this improvement in flow properties would have to be achieved without adversely affecting the physical properties of the final RIM part.

Compounds having terminal aromatic amine groups and having the general structure:

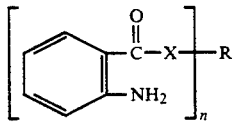

are known. In U.S. Pat. No. 3,808,250, X is defined as oxygen or sulfur, n is an integer of from 2 to 8, and R is defined as an n-valent radical obtained by the removal of hydroxy or mercapto groups from an n-valent polyether or polythioether having a molecular weight of from 600 to 10000. U.S. Pat. Nos. 3,817,940 and 3,929,863 describe similar compounds where R is based on a polyol or polythiol having a molecular weight of less than 600. U.S. Pat. Nos. 3,975,428 and 4,016,143 describe similar compounds prepared by reacting isatoic anhydride with a compound containing at least two hydroxyl groups and at least one tertiary nitrogen group and having a molecular weight of from about 119 to about 1000. Similar compounds are described in U.S. Pat. Nos. 4,136,091, 4,169,206, 4,186,257, 4,228,249 and 4,260,557. Para-substituted compounds are described in U.S. Pat. Nos. 4,504,648 and 4,515,981. Finally, similar para-, meta- and di-meta-substituted compounds are broadly suggested in U.S. Pat. Nos. 4,328,322 and 4,732,959. While all of these references describe that the compounds disclosed can be used to manufacture polyurethane products, none describe the use in a polyurea RIM process.

U.S. Pat. No. 4,847,416 and U.S. application Ser. No. 183,556, filed on Apr. 19, 1988, and U.S. application Ser. No. 266,725, filed on Nov. 3, 1988, describe similar compounds where the aromatic group is connected via ether groups. Both references broadly suggest the use of such amines in a RIM process.

DESCRIPTION OF THE INVENTION

The present invention is directed to a process for making a reaction injection molded elastomer comprising injecting a reaction mixture into a closed mold via a RIM machine with the ratio of components being such that the isocyanate index is from about 70 to about 130. The reaction mixture comprises:
a) an organic di- and/or polyisocyanate,
b) an amine terminated chain extender, and
c) a compound of the formula:

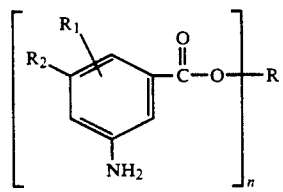

wherein
R is an n-valent group obtained by the removal of hydroxyl groups from an n-hydroxy group containing polyhydroxyl compound having a molecular weight of from about 300 to about 12,000,
$R_1$ represents hydrogen or an inert substituent,
$R_2$ represents hydrogen, an amine group, or an inert substituent, and
n represents an integer from 2 to 4.

The systems process very well primarily due to the relatively low viscosity of component c). Upon demold, the resultant product has excellent tear strength and releases from the mold readily. The molded parts exhibit no streaking, good green strength and are stiff and tough at demold. The corresponding para- and ortho-isomers are not operative in a similar amine-extended system.

The present invention is also directed to an isocyanate-reactive mixture comprising the compound c) and the amine terminated chain extender b).

The compounds c) useful herein are prepared by first reacting an n-valent polyhydroxyl compound with a meta-nitrobenzoic acid or, preferably, with the corresponding nitrobenzoyl chloride and thereafter hydrogenating the adduct to form the corresponding amino product.

The polyhydroxyl compounds used to produce component c) are preferably high molecular weight compounds having an average molecular weight of 300 to about 12,000 in particular 400 to about 6000 containing 2 to 4, preferably 2 or 3 reactive hydroxyl groups. Suitable examples include the hydroxyl group-containing compounds conventionally used in polyurethane chemistry such as hydroxyl-containing polyacetals, polythioethers, polycarbonates, polyamides, polysiloxanes and/or polybutadienes, polyesters, polyacetones and polyethers. Among these, polyethers containing hydroxyl groups are particularly preferred.

The hydroxyl polyethers suitable for the process according to the invention are known and may be prepared, for example, by the polymerization of epoxides such as ethylene oxide, propylene oxide, butylene oxide, tetrahydrofuran, styrene oxide or epichlorohydrin on their own, e.g. in the presence of $BF_3$, or by chemical addition of these epoxides, optionally as mixtures or successively, to starting components containing reactive hydrogen atoms such as water, alcohols or amines. Examples of suitable starters include ethylene glycol, propylene glycol-(1,3) or -(1,2), trimethylol propane 4,4'-dihydroxydiphenyl propane, aniline, ammonia, ethanolamine, glycerine, pentaerythritol, ethylene diamine, and the like. It is frequently preferred to use polyethers which contain predominantly primary OH groups (up to about 90% by weight, based on all of the OH groups in the polyether). Polyethers modified by vinyl polymers of the kind obtained, for example, by the polymerization of styrene and acrylonitrile in the presence of polyethers (U.S. Pat. Nos. 3,383,351, 3,304,273, 3,523,093 and 3,110,695 and German Patent 1,152,536) are also suitable, as are polybutadienes containing OH groups.

Suitable polyacetals include the compounds obtained from formaldehyde and glycols such as di- or triethylene glycol, 4,4'-dioxethoxy-diphenyl-dimethyl-methane (bisphenol A + 2 mol ethylene oxide) and hexane diol or by the polymerization of cyclic acetals, such as trioxane.

Suitable polycarbonates containing hydroxyl groups are known and include those prepared by the reaction of diols such as propane-1,3-diol, butane-1,-4-diol, hexane-1,6-diol, di-, tri- or tetraethylene glycol or thiodiglycol with phosgene or diaryl-carbonates.

The polyesters of dicarboxylic acids and diols may be those obtained from adipic acid and isophthalic acid and straight chained and/or branched diols as well as lactone polyesters, preferably those based on caprolactone and starter diols.

Particularly important among the polythioethers are the condensation products obtained by reacting thiodiglycol on its own and/or with other glycols.

Polyhydroxyl compounds already containing urethane or urea groups and modified or unmodified natural polyols may also be used. Products of addition of alkylene oxides to phenolformaldehyde resins or to urea formaldehyde resins may also be used according to the invention.

Polyhydroxyl compounds in which high molecular weight polyadducts or polycondensates or polymers are present in a finely dispersed or dissolved form may also be used according to the invention. Polyhydroxyl compounds of this type may be obtained, for example, by carrying out polyaddition reactions (e.g. reactions between polyisocyanates and amino functional compounds) or polycondensation reactions (e.g. between formaldehyde and phenols and/or amines) in situ in the above mentioned compounds containing hydroxyl groups.

Polyhydroxyl compounds modified with vinyl polymers such as those obtained, for example, by the polymerization of styrene and acrylonitrile in the presence of polyols are also suitable for the process according to the invention. Synthetic resins with exceptional flame resistance may be obtained by using polyether polyols which have been modified by graft polymerization with vinyl phosphonic acid esters and optionally (meth)acrylonitrile, (meth)acrylamide or OH-functional (meth)acrylic acid esters.

When modified polyhydroxyl compounds of the type mentioned above are used as starting materials for the polyamines, the resulting starting components used in the polyisocyanate polyaddition processes in many cases result in polyurethanes which have substantially improved mechanical properties.

Suitable, although less preferred, polyhydroxyl components also include organofunctional polysiloxanes containing two terminal isocyanate-reactive groups. Both the known, pure polysiloxanes containing organofunctional end groups and the known siloxane polyoxyalkylene copolymers containing organofunctional end groups are suitable starting materials according to the invention.

Starting materials for producing the amino compound c) include 3,5-dinitrobenzoic acids, meta-nitrobenzoic acids or the corresponding benzoyl chlorides optionally substituted with inert substituents. By "inert substituent" is meant any substituent that does not react with an amine, nitro, hydroxyl or isocyanate group, and includes lower alkyl of from 1 to 8 carbon atoms such as methyl, ethyl, propyl, butyl and the like; $C_8$ to $C_{12}$ aryl groups, $C_7$ to $C_{10}$ aralkyl groups, $C_4$ to $C_6$ cycloalkyl groups; and $C_1$ to $C_8$ alkoxy groups.

Examples of suitable compounds of this type include 3,5-dinitrobenzoic acid, 3-nitrobenzoic acid, 3-nitrobenzoyl chloride, 4-methyl-3-nitrobenzoyl chloride, and the like.

In the first step, the benzoic acid derivative or corresponding benzoyl chloride may be used in stoichiometric quantity, in excess or in substoichiometric quantity with respect to the polyol. The quantity of acid is preferably calculated to provide about 0.75 to 1.5 mol of benzoic acid derivative for each equivalent of hydroxyl groups of polyol. The use of an acid catalyst is required in the case of using benzoic acids types. When the corresponding benzoyl chloride derivative is used, no catalyst is necessary; however, tertiary amines can be used to promote the reaction and complex the hydrogen halide released. The tertiary amines may be used in stoichiometric quantity, in excess or in substoichiometric quantity with respect to the benzoyl chloride. The quantity of amine is preferably calculated to provide about 1 mole of tertiary amine for each equivalent of benzoyl chloride type.

The first step may be carried out solvent free or in the presence of an organic solvent. The components for the reaction may be present in a homogeneous phase or diphasic, i.e., as solutions, emulsions or suspensions.

Examples of suitable organic solvents include benzene, toluene, xylene, chlorobenzene, dichlorobenzene, trichlorobenzene, diethylether, diisopropylether, tert.-butylmethylether, tetrahydrofuran, dioxane, ethylene glycol dimethylether, acetonitrile, methylene chloride, chloroform, trichloroethylene, tetrachloroethylene, nitromethane and nitropropane. Mixtures of such solvents may, of course, also be used. It is preferred that the first step be performed in the absence of solvent.

The first step of the process of preparing the amines is generally carried out at about 90° to 130° C. either continuously or batchwise. The reaction time is generally about 8 to 24 hours, preferably about 12 to 18 hours.

The crude product obtained may generally be worked up, in the case of the benzoic acid approach, by neutralization of the acid catalyst with a base and filtration of the resultant salt. In the case of the benzoyl chloride approach where no tertiary amine is used, the hydrogen chloride can be removed by either nitrogen purging or by use of vacuum. If a tertiary amine is used, the resultant hydrogen chloride salt can be removed by filtration or by neutralization with a base followed by distillation (vacuum) of the tertiary amine and then filtration of the inorganic salt.

It is possible in principle but is less preferred to transfer the reaction mixture obtained from the first step directly to the second step without first isolating it.

The compounds containing nitro groups obtained in the first step are converted into the corresponding polyamines in known manner by reduction with nascent or catalytic hydrogen, for example hydrogen which has been activated with Raney nickel or with palladium on charcoal. This hydrogenation may be carried out in the presence or absence of inert solvents, at about 20° to 120° C. and under a pressure of about 20 to 80 bar. Suitable solvents include methanol, ethanol, i-propanol, toluene and DMF, among others. Methanol is preferred. The polyamines are obtained as distillation residue from the distillative removal of solvent and may be used for production of polyurethane resins without further purification.

The polyamines obtained from working up the reaction mixture are generally products with a brownish color and are distinguished from previously known aromatic aminopolyethers by their substantially lower viscosity. Apart from the functional groups already present in the polyhydroxyl compounds from which they have been obtained, e.g. ether groups, thioether groups, dialkyl siloxane, carbonate groups and/or polybutadiene groups, they only contain ester groups corresponding in number to their functionality.

The isocyanate (component a)) used in the process of the present invention is preferably an aromatic diisocyanate and/or polyisocyanate, i.e., a polyisocyanate in which all of the isocyanate groups are aromatically bound. Examples of such compounds include 2,4- and/or 2,6-diisocyanatotoluene; 2,2'-, 2,4'- and/or 4,4'-diisocyanatodiphenyl methane, mixtures of the last-mentioned isomers with their higher homologues (such as are obtained from the known reaction of the phosgenation of aniline/formaldehyde condensates); compounds containing urethane groups obtained as products of reaction of the above-mentioned di- and/or polyisocyanates with subequivalent quantities of polyhydroxyl compounds having molecular weights of from 62 to 10,000, (e.g., ethylene glycol, trimethylol propane, propylene glycol, dipropylene glycol or polypropylene glycols, and polyester glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Specification No. 0,024,665); or mixtures of such aromatic di- and polyisocyanates.

Included among the preferred isocyanates are the derivatives of 4,4'-diisocyanatodiphenyl methane which are liquid at room temperature. Specific examples of such compounds are polyisocyanates containing urethane groups obtainable according to German Patent 1,618,380 (U.S. Pat. No. 3,644,457) by reacting 1 mol of 4,4'-diisocyanatodiphenyl methane with from 0.05–0.3 mol of low molecular weight diols or triols, (preferably polypropylene glycols having molecular weights below 700); diisocyanates based on 4,4'-diisocyanatodiphenyl methane containing carbodiimide and/or uretoneimine groups, such as those disclosed in U.S. Pat. Nos. 3,152,162; 3,384,653 and 3,449,256, German Offenlegungsschrift No. 2,537,685 and European Specification No. 5233 (U.S. Ser. No. 903,308). Also included among the preferred polyisocyanates are the corresponding modified products based on mixtures of 2,4'- and 4,4'-diisocyanatodiphenyl methane or mixtures of the above-described modified 4,4'-diisocyanatodiphenylmethanes with minor quantities of higher than difunctional polyisocyanates of the diphenyl methane series. Such polyisocyanates are described in German Offenlegungsschrift 2,624,526. The preferred polyisocyanate mixtures of the diphenyl methane series are liquid at room temperature and have optionally been chemically modified as described above, with an average isocyanate functionality of from 2 to 2.8 (preferably from 2.1 to 2.7) containing 4,4'-diisocyanatodiphenyl methane as the main component (amounting to more than 40 wt. %).

The diamines used as component b) in the process of the present invention generally have molecular weights of from 108 to 400 and preferably contain exclusively aromatically bound primary or secondary (preferably primary) amino groups. Examples of such diamines are: 1,4-diaminobenzene, 2,4-diaminotoluene, 2,4- and/or 4,4'-diaminodiphenyl methane, 3,3'-dimethyl-4,4'-diaminodiphenyl methane, 4,4'-diaminodiphenylpropane-(2,2), mixtures of such diamines, and the like.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 4 carbon atoms. It is particularly preferred to use such compounds in which an ethyl, n-propyl, isopropyl, t-butyl and/or methylthio substituent is present in at least one position ortho to the amino groups and possibly methyl substituents in other positions ortho to the amino groups.

Specific examples of preferred amines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3'5'-tetraisopropyl-4,4'-diaminodiphenyl methane, 3,5-diethyl-3,5'-di-isopropyl-4,4-diaminodiphenyl methane, t-butyl toluenediamine and bis-thiomethyl toluene diamine. Also useful are adducts of these aminos with epoxy resins. It is also within the scope of this invention to use aliphatic amine chain extender materials as described in U.S. Pat. Nos. 4,246,363, 4,269,945, 4,495,081 and 4,530,941, although the aliphatic amines are not preferred.

The above-mentioned diamines may, of course, also be used as mixtures. It is particularly preferred to use 1-methyl-3,5-diethyl-2,4-diamino-benzene or a mixture of this compound with 1-methyl-3,5-diethyl-2,6-diaminobenzene.

The diamine chain lengthening agent (component b)) in the process of the present invention is preferably used in quantities of from 5 to 50 wt. %, most preferably from 10 to 40 wt. % (based on the weight of component c)).

Known mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 1,365,215), German Offenlegungsschrift 2,431,968 (U.S. Pat. No. 4,098,731), German Offenlegungsschrift 2,404,310 (U.S. Pat. No. 4,058,492) and U.S. Pat. Nos. 4,519,965 and 4,581,386 are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes. Also preferred are the zinc salts described in U.S. Pat. Nos. 4,519,965 and 4,581,386.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono and/or polyisocyanates (according to German Offenlegungsschrift 2,356,692 (U.S. Pat. No. 4,033,912); esters of mono- and/or polycarboxylic acids and polysiloxanes containing hydroxyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the components b) and c). However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethyl-morpholine, N-cocomorpholine, N,N,N',N'-tetramethylethylene diamine, 1,4-diazabicyclo-(2,2.2)-octane, N-methyl-N'-dimethyl-aminoethyl piperazine, N,N-dimethyl-benzylamine, bis-(N,N-diethylamino)-adipate, N,N-diethyl benzylamine, pentamethyl diethylene triamine, N,N-dimethylcyclohexylamine, N,N,N',N'-tetramethyl-1,3-butanediamine, 1,2-dimethylimidazole and 2-methyl-imidazole.

Organometallic catalysts may also be used in the practice of the present invention. Particularly useful organometallic catalysts include organic tin catalysts such as tin(II) salts of carboxylic acids (e.g., tin-(II)-acetate, tin-(II)-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component c)) are appropriate.

The products of the process of the present invention are preferably molded elastomeric articles. Blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorofluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as ricinoleic acid or polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate and polyphosphate), stabilizers against aging and weathering, plasticizers, fungistatic and bacteriostatic substances, and fillers (such as barium sulfate, glass fibers, kieselgur or whiting).

Other examples of suitable surface active additives and foam stabilizers, flame retardants, plasticizers, dyes, fillers and fungistatic and bacteriostatic substances and details concerning the use of mode of action of these additives may be found in Kunststoff Handbuch, Volume VII, published by Vieweg and Hochtlen, Carl Hanser Verlag, Munich 1966, e.g., on pages 103 to 113.

When carrying out the process of the present invention, the quantity of polyisocyanates (component a)) should preferably be such that the isocyanate index is from 70 to 130, most preferably 90 to 110 in the reaction mixture.

The process of the present invention is carried out by the known reaction injection molding technique (RIM process). Two streams are generally employed in this molding technique. In the present invention, the polyisocyanate (component a)) is the first reactant and the "polyamine component" (i.e., the mixture of component c), and the diamine component c)), is the second reactant. If any auxiliary agents or additives are used, they are generally mixed with the "polyamine component". However, it may be advantageous, for example when using a mold release agent containing isocyanate groups, to incorporate the release agent with the reactant polyisocyanate (component a)) before the process of the present invention is carried out. It is possible in principle to use mix heads in which three or four separate components may be simultaneously introduced so that no preliminary mixing of the individual components is required. The quantity of reaction mixture introduced into the mold is generally calculated to produce molded articles having densities of from 0.8 to 1.4 g/cm$^3$, preferably from 0.9 to 1.2 g/cm$^3$. When mineral fillers are used, however, the molded articles may have densities above 1.2 g/cm$^3$. The articles may be removed from the mold after they have been left in there from 5 to 90 seconds, preferably from 20 to 60 seconds.

The reactant mixture is generally introduced into the mold at a starting temperature of from 10° to 60° C., preferably from 20° to 50° C. The temperature of the mold itself is generally from 40° to 100° C., preferably from 50° to 70° C.

The molded articles obtainable by the process of the present invention are particularly suitable for the manufacture of flexible automobile bumpers or car body parts.

The invention is further illustrated but is not intended to be limited by the following examples in which all parts and percentages are by weight unless otherwise specified.

In the examples, the following materials were used:

POLYAMINE A

To a five liter, 3-neck flask equipped with a mechanical stirrer, thermometer, and purged with nitrogen were added 2866 parts of a 4800 molecular weight glycerine/propylene oxide/ethylene oxide polyether (having 17% by weight ethylene oxide termination) and 365 parts of 4-methyl-3-nitrobenzoyl chloride. The reaction mixture was heated to 90° C. and held for 18 hours. The reaction mixture was then heated to 130° C. under reduced pressure to remove any residual hydrogen chloride and 4-methyl-3-nitrobenzoyl chloride. The aromatic nitro-terminated polyether had a viscosity at 25° C. of 1456 mPa.s. 3048 parts of the nitro-terminated polyether, 6000 ml of methanol, and 400 parts of Raney nickel were added to a five gallon high pressure hydrogenation reactor. The reaction mixture was stirred under a 1000 psi hydrogen gas pressure while being heated over a 30 minute period to 130° C. After 4 hours at 130° C., the reaction mixture was cooled to about 30° C. and the Raney nickel was removed by filtration. The methanol was removed by distillation. The reaction mixture was then heated to 120° C. under reduced pressure and held for 15 minutes to remove any residual methanol and/or low boiling materials. The resultant aromatic amine-terminated polyether was then filtered to yield a product having a viscosity at 25° C. of 2580 mPa.s and an amine number of 31.2.

POLYAMINE B

To a five liter, 3-neck flask equipped with a mechanical stirrer, thermometer, and purged with nitrogen were added 3000 parts of a 4800 molecular weight glycerine/propylene oxide/ethylene oxide polyether (having 17% by weight ethylene oxide termination) and 348 parts of 3-nitrobenzoyl chloride. The reaction mixture was heated to 90° C. and held for 18 hours. The reaction mixture was then heated to 130° C. under reduced pressure to remove any residual hydrogen chloride and 3-nitrobenzoyl chloride. The aromatic nitro-terminated polyether had a viscosity at 25° C. of 1532 mPa.s. 3949 parts of the nitro-terminated polyether, 6000 ml of methanol, and 400 parts of Raney nickel were added to a five gallon high pressure hydrogenation reactor. The reaction mixture was stirred under a 1000 psi hydrogen gas pressure while being heated over a 30 minute period to 130° C. After 4 hours at 130° C., the reaction mixture was cooled to about 30° C. and the Raney nickel was removed by filtration. The methanol was removed by distillation. The reaction mixture was then heated to 120° C. under reduced pressure and held for 15 minutes to remove any residual methanol and/or low boiling materials. The resultant aromatic amine-terminated polyether was then filtered to yield a product having a viscosity at 25° C. of 2896 mPa.s and an amine number of 30.5.

POLYAMINE C

To a 12 liter, 3-neck flask equipped with a mechanical stirrer, thermometer, condenser, and purged with dry nitrogen were added 739 parts of isatoic anhydride, 8.5 parts of triethylenediamine, and 7252 parts of the same polyether used to produce POLYAMINE A. The reaction mixture was heated to 90° C. and held for 20 hours. The reaction mixture was then cooled to 30° C. and filtered. The aromatic amine-terminated polyether had an amine number of 29.7, and a viscosity at 25° C. of 2160 mPa.s.

POLYAMINE D

To a five liter, 3-neck flask equipped with a mechanical stirrer, thermometer, and purged with nitrogen were added 3838 parts of a 4800 molecular weight glycerine/propylene oxide/ethylene oxide polyether (having 17% by weight ethylene oxide termination) and 445 parts of 4-nitrobenzoyl chloride. The reaction mixture was heated to 90° C. and held for 18 hours. The reaction mixture was then heated to 130° C. under reduced pressure to remove any residual hydrogen chloride and 4-nitrobenzoyl chloride. The aromatic nitro-terminated polyether had a viscosity at 25° C. of 1380 mPa.s. 4000 parts of the nitro-terminated polyether, 6000 ml of methanol, and 400 parts of Raney nickel were added to a five gallon high pressure hydrogenation reactor. The reaction mixture was stirred under a 1000 psi hydrogen gas pressure while being heated over a 30 minute period to 130° C. After 4 hours at 130° C., the reaction mixture was cooled to about 30° C. and the Raney nickel was removed by filtration. The methanol was removed by distillation. The reaction mixture was then heated to 120° C. under reduced pressure and held for 15 minutes to remove any residual methanol and/or low boiling materials. The resultant aromatic amine-terminated polyether was then filtered to yield a product having a viscosity at 25° C. of 3810 mPa.s and an amine number of 32.2.

POLYAMINE E

To a three liter, 3-neck flask equipped with a mechanical stirrer, thermometer, and Dean Stark trap fitted with a condenser, were added 1600 parts of the 4800 molecular weight polyether used in POLYAMINE A, 167 parts of meta-nitrobenzoic acid, 867 parts of toluene, and 17 parts of concentrated sulfuric acid. The reaction mixture was heated to 120° C. which caused the toluene to reflux. The reaction mixture was held at reflux for 16 hours (18 parts of water were obtained in the trap). A solution of sodium hydroxide (7 grams dissolved in 100 ml of water) were then added. The reaction mixture was refluxed for an additional hour. Toluene and water were then removed by distillation. The reaction mixture was then heated to 130° C. under reduced pressure and held for about 15 minutes to remove any residual toluene and water. The reaction mixture was then cooled to about 50° C. and filtered to remove the salt. The aromatic nitro terminated polyether had a viscosity of 1406 mPa.s at 25° C. 3410 parts of the nitro-terminated polyether, 6000 ml of methanol, and 400 parts of Raney nickel were added to a five gallon high pressure hydrogenation reactor. The reaction mixture was stirred under a 1000 psi hydrogen gas pressure while being heated over a 30 minute period to 130° C. After 4 hours at 130° C., the reaction mixture was cooled to about 30° C. and the Raney nickel was removed by filtration. The methanol was removed by distillation. The reaction mixture was then heated to 120° C. under reduced pressure and held for 15 minutes to remove any residual methanol and/or low boiling materials. The resultant aromatic amine-terminated polyether was then filtered to yield a product having a viscosity at 25° C. of 2420 mPa.s and an amine number of 29.6.

DETDA: diethyl toluene diamine.

M-4050: a propylene oxide/ethylene diamine adduct having an OH number of 630.

DB OIL: a castor oil available from Cas Chem.

L-5304: a silicone surfactant available from Union Carbide.

IMR-A: a polyester polyol prepared from 1 mole of adipic acid, 6 moles of oleic acid, and 2.5 moles of pentaerythritol having an OH number of about 51.

IMR-B: a nonreactive component prepared from the product of neopentyl glycol and dimer acid, which is capped with stearic acid. This product is prepared as follows: To a 12 liter, 3-neck flask equipped with a mechanical stirrer, thermometer, packed column and distillation apparatus were added 2400 parts of neopentyl glycol, 6657 parts of dimer acid, and 240 parts of propylene glycol. The reaction mixture was slowly heated to 215° C. over 8 hours under atmospheric pressure. The reaction mixture was then placed under vacuum slowly so that the head temperature never exceeded the boiling point of water. Low boiling glycols were then removed under vacuum distillation (<20 mm Hg). The resulting polyester had an OH number of 130. 4100 parts of the polyester and 2717 parts of stearic acid were then added to a 12 liter, 3-neck flask equipped as above. The reaction mixture was heated slowly to 215° C. over 4 hours under atmospheric pressure followed by vacuum distillation (<20 mm Hg) for an additional 4 hours. The product was characterized by the absence of the OH band at 3500 cm$^{-1}$ in the infrared spectra.

ZNL: zinc laurate.

DEG: diethylene glycol.

TCB: trichlorobenzene.

ISO: the isocyanate used was a blend of (i) 20 parts by weight of a polymethylene poly(phenylisocyanate) having an isocyanate content of 32.5%, with a 19% by weight of 2,4'-isomer content, and an isocyanate functionality of about 2.4, and (ii) 80 parts by weight of a 19% isocyanate content prepolymer prepared by reacting a blend of a) 56 parts of 4,4'-methylene bis(phenylisocyanate) and b) 6 parts by weight of a carbodiimide-group modified 4,4'-methylene bis(phenylisocyanate) having an NCO content of 29.3%, with c) a 2000 molecular weight polyester diol (based on adipic acid, 1,4-butane diol and ethylene glycol). The blend had an NCO content of about 21.6% by weight.

EXAMPLES

The flowability characteristics of the systems noted in the following table were determined using the servodyne activity method. The servodyne method was developed to measure the activity (gel time) of very fast RIM systems. The servodyne actually measures the increasing viscosity of a reacting system. Thus the time is measured from when the mixing starts (the reaction begins) to the formation of a solid polymer. In the solution method, the components are reacted in a solvent. 30.8 parts of the various isocyanate reactive components and the catalyst, if required, are mixed with 109.2 parts of TCB. The resultant solution is then mixed with the isocyanate component, 24.4 parts of which has also been mixed with 115.6 parts of TCB. For the solution method, times of from more than 20 seconds to less than 100 seconds would indicate systems which would operate well in an actual RIM process. Times less than 20 seconds would indicate systems that react too rapidly to fill a mold, while times of more than 100 seconds are too slow for large scale commercial production. In the experiments, the materials noted in the following Table 1 were mixed and the gel times noted.

TABLE 1

| Example | A | B | C | D |
|---|---|---|---|---|
| POLYAMINE A | 66.3 | — | — | — |
| POLYAMINE B | — | 66.3 | — | — |
| POLYAMINE C | — | — | 66.3 | — |
| POLYAMINE D | — | — | — | 66.3 |
| DETDA | 23 | 23 | 23 | 23 |
| M-4050 | 3 | 3 | 3 | 3 |
| ZNL | 2 | 2 | 2 | 2 |
| IMR-A | 2 | 2 | 2 | 2 |
| DEG | 3 | 3 | 3 | 3 |
| L-5304 | 0.75 | 0.75 | 0.75 | 0.75 |
| ISO (105 index) | 78.7 | 78.7 | 78.7 | 78.7 |
| Gel Time, sec. | 39 | 33 | >2400 | >2400 |

RIM plaques were then prepared using a laboratory piston metering unit and a clamping unit. The metering unit was a two component instrument having a maximum metering capacity of 0.6 liters. A rectangular mold, 300 mm×200 mm× 3 mm was used to mold the samples under the following conditions:

| | |
|---|---|
| Component A temperature (iso) | 40° C. |
| Component B temperature | 60° C. |
| Isocyanate Index | 105 |
| Mold temperature | 65° C. |
| Mix pressure | 2646 psi |
| Demold time | 45 sec |

The formulations used and the physical properties were as indicated in the following Table 2. Polyamine D was not used since the servodyne data indicated that it would be too slow. The samples were tested for density (ASTM D-792), flex modulus (ASTM D-638), elongation (ASTM D-638), heat sag (ASTM D-3769), notched Izod (ASTM D-256), and tear strength-die "C" (ASTM D-624). Examples 3 is a comparative examples.

TABLE 2

| | 1 | 2 | 3 | 4 |
|---|---|---|---|---|
| B-SIDE | | | | |
| POLYAMINE A | 66.25 | — | — | — |
| POLYAMINE B | — | 66.25 | — | — |
| POLYAMINE C | — | — | 66.25 | — |
| POLYAMINE E | — | — | — | 66.25 |
| M-4050 | 3 | 3 | 3 | 3 |
| DETDA | 25 | 25 | 25 | 25 |
| IMR-B | 3 | 3 | 3 | 3 |
| DB OIL | 2 | 2 | 2 | 2 |
| L-5304 | 0.75 | 0.75 | 0.75 | 0.75 |
| A-SIDE | | | | |
| ISO | 73.0 | 73.3 | 74.0 | 73.0 |
| RESULTS | | | | |
| Density, lb/ft³ | 66.7 | 66.4 | — | 66.3 |
| Flex Mod. psi | 58,110 | 45,780 | — | 46,950 |
| Elongation, % | 169 | 156 | — | 105 |
| Tear Strength, lb/in | 503 | 434 | — | 341 |
| Izod, ft-lb/in | 6.91 | 7.00 | — | 5.9 |
| Heat Sag | | | | |
| 4" 325 F., mm | 6.7 | 9.0 | — | 6.2 |
| 6" 250 F., mm | 5.3 | 9.3 | — | 6.8 |
| PROCESSING | exc. | exc. | could not prepare a panel | exc. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a reaction injection molded elastomer comprising injecting a reaction mixture into a closed mold via a RIM machine, with the ratio of components being such that the isocyanate index is from about 70 to about 130, said reaction mixture comprising
   (a) an organic di- and/or polyisocyanate,
   (b) an amine terminated chain extender, and
   (c) a compound of the formula:

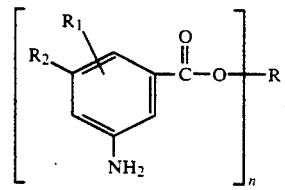

wherein
   R is an n-valent group obtained by the removal of hydroxyl groups from an n-hydroxy group containing polyhydroxyl compound having a molecular weight of from about 300 to about 12,000,
   $R_1$ represents hydrogen or an inert substituent,
   $R_2$ represents hydrogen, an amine group, or an inert substituent, and
   n represents an integer from 2 to 4.

2. The process of claim 1 where R is an n-valent group obtained by the removal of hydroxyl groups from an n-hydroxyl group-containing polyether having a molecular weight of from about 300 to about 12,000.

3. The process of claim 1 wherein n is 2 or 3.

4. The process of claim 1 wherein $R_1$ is hydrogen.

5. The process of claim 1 wherein component (b) has a molecular weight of from 108 to 400.

6. The process of claim 5 wherein component (b) is an aromatic amine.

7. The process of claim 6 wherein said component (b) is 1-methyl-3,5-diethyl-2,4- and/or -2,6-diaminobenzene.

8. The process of claim 6 wherein said reaction mixture also includes a release agent.

9. The process of claim 1 wherein said isocyanate index is from 90 to 110.

10. The product produced by the process of claim 1.

11. An isocyanate reactive composition comprising
   (i) an amine terminated chain extender, and
   (ii) a compound of the formula

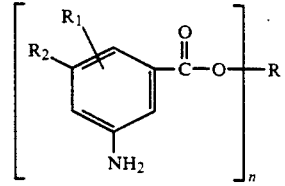

wherein
   R is an n-valent group obtained by the removal of hydroxyl groups from an n-hydroxy group containing polyhydroxyl compound having a molecular weight of from about 300 to about 12,000,
   $R_1$ represents hydrogen or an inert substituent,
   $R_2$ represents hydrogen, an amine group, or an inert substituent, and
   n represents an integer from 2 to 4.

12. The composition of claim 11 where R is an n-valent group obtained by the removal of hydroxyl groups from an n-hydroxyl group-containing polyether having a molecular weight of from about 300 to about 12,000.

13. The composition of claim 11 wherein n is 2 or 3.

14. The composition of claim 11 wherein component (i) is an aromatic amine.

* * * * *